United States Patent
Asthana

(10) Patent No.: US 7,320,057 B2
(45) Date of Patent: *Jan. 15, 2008

(54) MEMORY MANAGEMENT SYSTEM AND METHOD FOR A MOBILE DEVICE

(75) Inventor: Atul Asthana, Unionville (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/595,745

(22) Filed: Nov. 10, 2006

(65) Prior Publication Data

US 2007/0061527 A1    Mar. 15, 2007

Related U.S. Application Data

(63) Continuation of application No. 10/786,977, filed on Feb. 25, 2004, now Pat. No. 7,155,583.

(51) Int. Cl.
*G06F 12/12* (2006.01)
(52) U.S. Cl. ............. 711/159; 711/133; 711/170; 707/206
(58) Field of Classification Search ............ None
See application file for complete search history.

(56) References Cited

U.S. PATENT DOCUMENTS

| | | | |
|---|---|---|---|
| 5,758,050 A | 5/1998 | Brady et al. | |
| 6,128,713 A | 10/2000 | Eisler et al. | |
| 6,944,861 B2 | 9/2005 | Inoue et al. | |
| 7,000,087 B2 | 2/2006 | Atherton et al. | |
| 2002/0059507 A1 | 5/2002 | Hironaka | |
| 2004/0004805 A1* | 1/2004 | Jerding et al. | 361/321.5 |
| 2004/0060041 A1* | 3/2004 | Demsey et al. | 717/151 |

FOREIGN PATENT DOCUMENTS

WO    WO 2004/010306 A1    1/2004

OTHER PUBLICATIONS

RAM Charger 8 for Macintosh, Jul. 15, 1998, JUMP Development Group, XP-002286542 (2 pgs).

* cited by examiner

*Primary Examiner*—Jasmine Song
(74) *Attorney, Agent, or Firm*—Jones Day; Krishna K. Pathiyal; Robert C. Liang

(57) ABSTRACT

In accordance with the teachings described herein, systems and methods are provided for managing memory on a mobile device. A maximum amount of available data storage memory may be allocated for storing data for each of a plurality of software applications loaded on the mobile device. If additional memory is needed for an executing software application, then one of the plurality of software applications may be selected for memory clean-up. Data may then be deleted from the data storage memory allocated to the selected software application in accordance with a pre-established memory retention policy for the selected software application.

25 Claims, 4 Drawing Sheets

| | MIN 32 | MAX 33 | THRESHOLD 34 | MEMORY RETENTION POLICY 36 | MEMORY RETENTION TARGET 37 | PRIORITY 38 |
|---|---|---|---|---|---|---|
| APPLICATION 1 (BROWSER) 40 | .025T (100k) | .25T (1M) | .1875T (750k) | LRU | .125T (500k) | MEDIUM |
| APPLICATION 2 (GAME) 41 | 0 (0) | .0125T (50k) | .015T (60k) | LARGEST | .0075T (30k) | LOW |
| APPLICATION 3 (EMAIL) 42 | .0625T (250k) | .25T (1M) | .175T (700k) | FIFO | .1T (400k) | HIGH |
| ... | ... | ... | ... | ... | | |
| APPLICATION N (ADDRESS BOOK) 43 | .025T (100k) | .075T (300k) | .0625T (250k) | NEVER DELETE | | HIGHEST |

MEMORY MANAGEMENT SYSTEM AND METHOD FOR A MOBILE DEVICE

CROSS REFERENCE TO RELATED APPLICATION

This application is a continuation of U.S. Ser. No. 10/786,977, filed on Feb. 25, 2004 now U.S. Pat. No. 7,155,583. The entirety of this application is hereby incorporated herein by reference.

FIELD

The technology described in this patent document relates generally to the fields of memory allocation and management. More particularly, the patent document describes a memory management system and method that is particularly well-suited for use in a mobile device.

BACKGROUND AND SUMMARY

In a typical mobile device, there are an increasing number of competing software applications, each with different memory requirements, caching policies and memory management requirements. Such mobile devices may include cellular telephones, two-way paging devices, personal digital assistants, and/or other devices having similar memory constraints.

In accordance with the teachings described herein, systems and methods are provided for managing memory on a mobile device. A maximum amount of available data storage memory may be allocated for storing data for each of a plurality of software applications loaded on the mobile device. If additional memory is needed for an executing software application, then one of the plurality of software applications may be selected for memory clean-up. Data may then be deleted from the data storage memory allocated to the selected software application in accordance with a pre-established memory retention policy for the selected software application.

BRIEF DESCRIPTION OF THE DRAWINGS

FIG. 2 illustrates an example memory allocation and retention table for use with the memory management system of FIG. 1;

DETAILED DESCRIPTION

Figure 1:
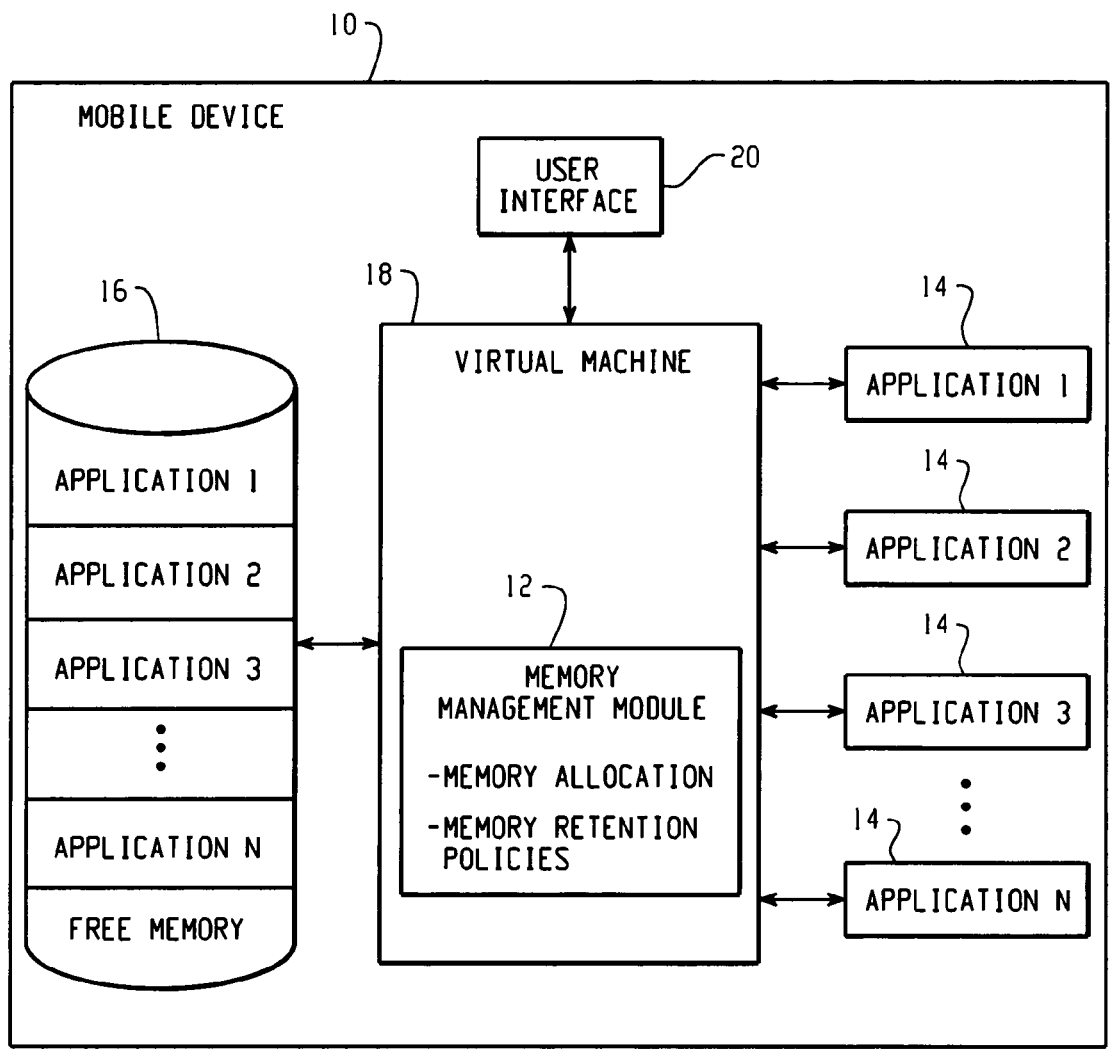
FIG. 1 is a block diagram of an example memory management system for a mobile device.

With reference now to the drawing figures, FIG. 1 is a block diagram of an example memory management system for a mobile device 10. The system includes a memory management module 12, a plurality of software applications 14, and a data storage location 16. Also illustrated are a virtual machine 18 and a user interface 20.

The memory management module 12 may be a software application stored in a memory location and executed by the virtual machine 18 to perform memory allocation and retention functions, as described below. The memory management module 12 may, for example, be a JAVA® application that operates on a JAVA® virtual machine 18 installed on the mobile device 10. The software applications 14 may also be JAVA® applications that are stored in a memory location and executed by the virtual machine 18. It should be understood, however, that the memory management module 12 and software applications 14 may be executed using operating systems other than a JAVA® virtual machine 18. The software applications 14 may include an electronic messaging application, a calendar application, an address book application, an Internet browser application, a game application(s), and/or other software. The data storage location 16 may be a writable storage medium, such as a FLASH memory (see, e.g., FIG. 4), for storing application data. The software code for the memory management module 12 and software applications 14 may also be stored in the data storage location 16.

In operation, the memory management module 12 allocates the amount of memory 16 available to each of the software applications 14 for storing data, and implements memory retention policies to free needed memory. The memory management module 12 maintains memory allocation and retention data for the software applications 14 to control the amount of memory 16 that each software application 14 may utilize (see, e.g., FIG. 2). The amount of memory 16 allocated to each software application 14 may be configured by the memory management module 12 when the software applications 14 are installed to the mobile device 10, and may preferably be modified by a device user via the user interface 20. If additional memory is needed by a particular software application 14, then the memory management module 12 may allocate additional memory (i.e., free memory), if available, or may attempt to free additional memory by implementing the memory retention policies.

For example, if Application 1 requires additional memory to store data, then the memory management module 12 may first determine if any free memory is available for allocation to Application 1. Free memory may either be allocated automatically by the memory management module 12 or may be allocated with permission from the device user. If no free memory is available, then the memory management module 12 may attempt to "clean up" the memory segment allocated to Application 1 or may reallocate memory from one or more of the memory segments allocated to Applications 2-N in accordance with the memory retention policies.

FIG. 2 illustrates an example memory allocation and retention table 30 for use with the memory management system of FIG. 1. The table 30 includes memory allocation data 32-34 and memory retention data 36-38 for each software application 40-43. The memory allocation data 32-34 identifies a minimum memory allocation 32, a maximum memory allocation 33 and a memory threshold 34 for each of the software applications 40-43. The memory retention data 36-38 identifies a memory retention policy 36, a memory retention target 37 and a priority level 38 for each of the software applications 40-43.

With reference to the memory allocation data 32-34, the minimum memory allocation 32 identifies the minimum amount of memory that needs to be allocated to a particular software application 40-43 for proper operation. The maximum memory allocation 33 identifies the amount of memory currently allocated for a particular application 40-43. The memory threshold 34 represents the amount of available memory for each software application 40-43 that may be filled before executing the memory retention policies. Example memory allocation values 32-34 are illustrated in FIG. 2 for a browser application, a game application 41, an email application 42, and an address book application 43. For instance, the example browser application 40 has a minimum memory allocation of 0.025T, a maximum memory allocation of 0.25T and a memory threshold of 0.1875T, where T is the total available memory. Illustrated in parentheses are example memory allocation values 32-34 for a mobile device having a 4 megabyte memory device.

With reference to the memory retention data 36-38, the memory retention policy 36 identifies the memory retention algorithm used for deleting stored data for a particular software application 40-43 to free additional memory. Example memory retention policies 36 are least-recently-used (LRU), largest file size, first-in-first-out (FIFO), and never delete. The memory retention target 37 identifies an amount of filled memory that the memory management module 12 will attempt to achieve for a particular software application 40-43 by implementing the memory retention policy 36. For instance, in the illustrated example, if the memory management module 12 applies a LRU memory retention policy 36 to Application 1, then the stored data that has been accessed the least (i.e., the least-recently-used data) will be deleted until 0.125T bytes of data remain in the memory segment 16 allocated to Application 1.

The memory retention priority 38 may be used by the memory management module 12 to select which memory segments should be given the highest priority for memory retention purposes. For example, if additional memory is needed for one of the software applications 40-43 (and no free memory is available), then the memory management module 12 may first apply the designated memory retention policy 36 to the software application memory segment having the lowest priority 38. For instance, in the illustrated example, if any of the software applications 40-43 require additional memory, then the memory management module 12 may first attempt to free the needed memory by applying the designated memory retention policy 36 (largest file size) to Application 2 (the game application), which has the lowest memory retention priority.

Figure 3:
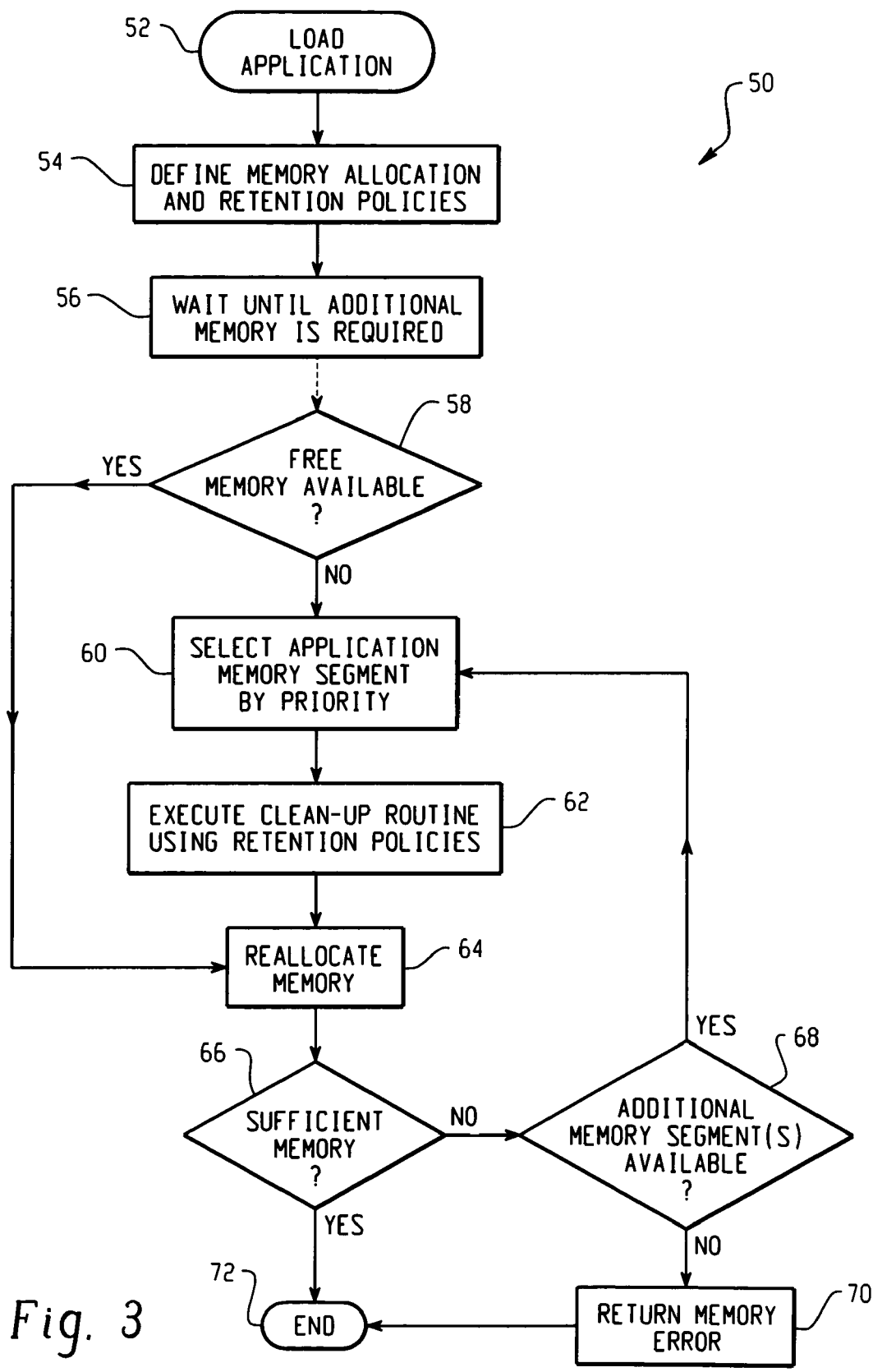
FIG. 3 is a flow diagram illustrating an example memory management method for a mobile device.

FIG. 3 is a flow diagram illustrating an example memory management method for a mobile device. At step 52, a new software application is loaded onto the mobile device. Memory allocation and retention policies are then defined for the new software application at step 54. Preferably, the memory allocation and retention policies are defined automatically upon loading the software application. In other cases, however, the memory allocation and retention policies may be defined by a device user.

After the software application is loaded and its memory allocation and retention policies are defined, the method 50 proceeds to step 56. The method 50 remains at step 56 during normal device operation, unless additional memory is needed by the software application. If additional memory is needed, then the method 50 proceeds to decision step 58. At step 58, the method 50 determines if free memory is available for allocation to the software application. If free memory is available, then the method skips to step 64 to reallocate the needed free memory. Else, if no free memory is available, then the method attempts to free additional memory at steps 60 and 62.

At step 60, an application memory segment is selected according to an application priority hierarchy, as described above with reference to FIG. 2. Then, at step 62 a memory retention policy (e.g., LRU, largest file size, FIFO, etc.) is applied to the selected application memory segment to free additional memory. The memory retention policy may be different for each software application. For example, the method may execute a sub-routine to identify memory retention parameters specific to a particular software application. An example system and method for identifying and applying a memory retention policy specific to a particular software application is described in the co-owned International Patent Application No. PCT/CA03/01104, entitled "Data Store Management System And Method For Wireless Devices," which is incorporated herein by reference. Once the memory retention policy has been implemented, then the memory is re-allocated at step 64.

At step 66, the method determines if sufficient memory has been reallocated to the software application. If so, then the method 50 ends at step 72. Else, if additional memory is needed, then the method proceeds to step 68. At step 68, the method 50 determines if there are any additional software memory segments available to free additional memory. If so, then the method returns to step 60 to select one of the additional software memory segments according to the application priority hierarchy. If no additional memory segments are available, however, then the method returns an error message at step 70 and ends at step 72.

Figure 4:
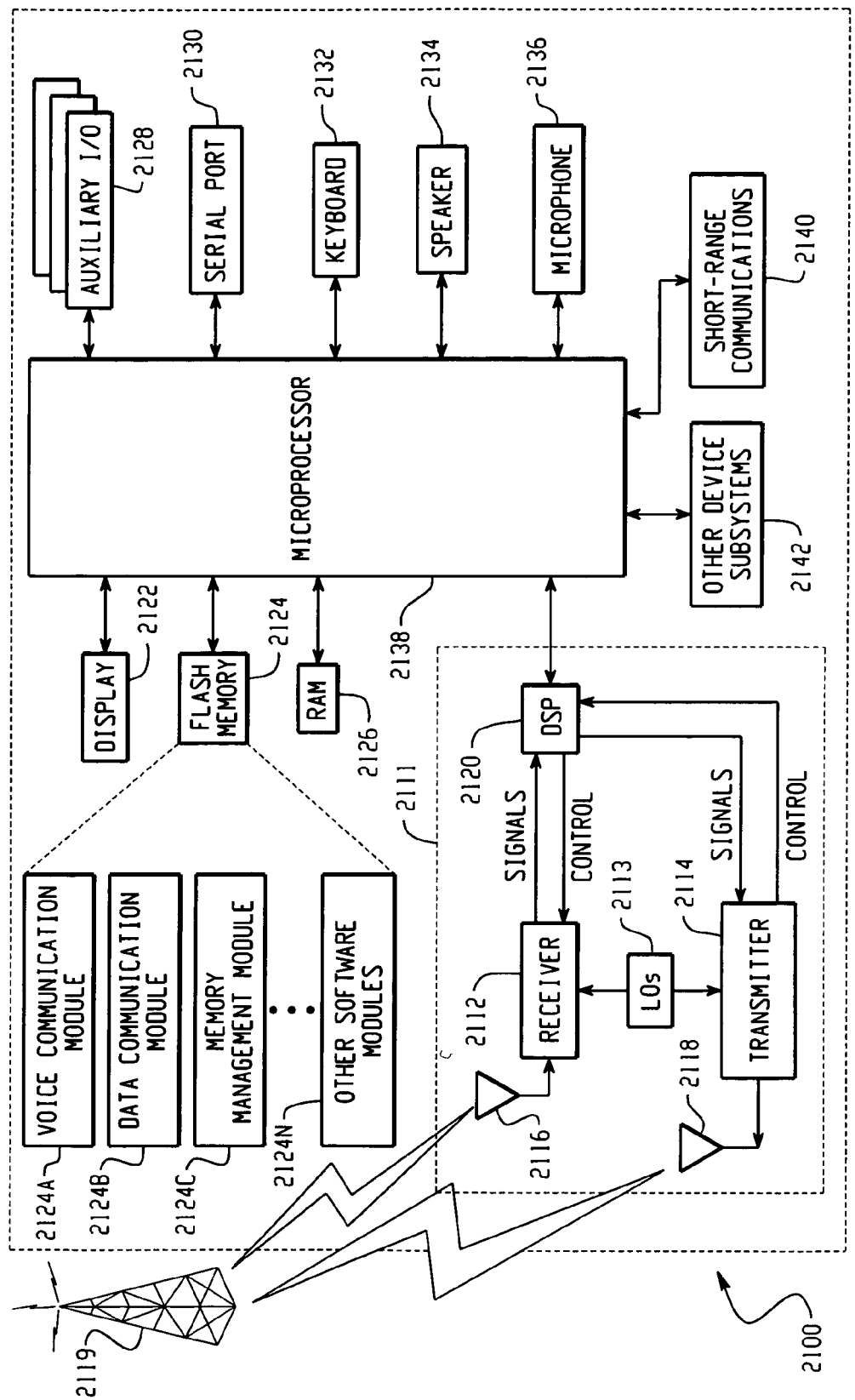
FIG. 4 is a block diagram of an example mobile device.

FIG. 4 is a block diagram illustrating an example mobile communication device 2100. The mobile communication device 2100 includes a processing subsystem 2138, a communications subsystem 2111, a short-range communications subsystem 2140, a memory subsystem 2124, 2126, and various other device subsystems and/or software modules 2142. The mobile communication device 2100 also includes a user interface, which may include a display 2122, a serial port 2130, a keyboard 2132, a speaker 2134, a microphone 2136, one or more auxiliary input/output devices 2128, and/or other user interface devices.

The processing subsystem 2138 controls the overall operation of the mobile communication device 2100. Operating system software executed by the processing subsystem 2138 may be stored in a persistent store, such as a flash memory 2124, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 2126. Communication signals received by the mobile communication device 2100 may also be stored to RAM 2126.

The processing subsystem 2138, in addition to its operating system functions, enables execution of software applications 2124 on the device 2100. A predetermined set of applications that control basic device operations, such as data and voice communications, may be installed on the device 2100 during manufacture. A personal information manager (PIM) application, including an electronic messaging application, may be installed on the device. The PIM may, for example, be operable to organize and manage data items, such as email, calendar events, voice mails, appointments, and task items. The PIM application may also be operable to send and receive data items via the wireless network 2119. In addition, the memory management module 2124C and application data storage location 16, as described above, may also be included in the flash memory 2124.

Communication functions, including data and voice communications, are performed through the communication subsystem 2111, and possibly through the short-range communications subsystem 2140. The communication subsystem 2111 includes a receiver 2112, a transmitter 2114 and one or more antennas 2116, 2118. In addition, the communication subsystem 2111 also includes a processing module, such as a digital signal processor (DSP) 2120 or other processing device(s), and local oscillators (LOs) 2113. The specific design and implementation of the communication subsystem 2111 is dependent upon the communication network in which the mobile communication device 2100 is intended to operate. For example, a mobile communication device 2100 may include a communication subsystem 2111 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile communication devices are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the mobile communication device 2100 may send and receive communication signals over the communication network 2119. Signals received by the antenna 2116 from the communication network 2119 are routed to the receiver 2112, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 2119 are processed (e.g., modulated and encoded) by the DSP 2120 and are then provided to the transmitter 2114 for digital to analog conversion, frequency up conversion, filtering, amplification and transmission to the communication network 2119 (or networks) via the antenna 2118.

In addition to processing communication signals, the DSP 2120 provides for receiver 2112 and transmitter 2114 control. For example, gains applied to communication signals in the receiver 2112 and transmitter 2114 may be adaptively controlled through automatic gain control algorithms implemented in the DSP 2120.

In a data communication mode, a received signal, such as a text message or web page download, is processed by the communication subsystem 2111 and input to the processing device 2138. The received signal is then further processed by the processing device 2138 for output to a display 2122, or alternatively to some other auxiliary I/O device 2128. A device user may also compose data items, such as email messages, using a keyboard 2138 and/or some other auxiliary I/O device 2128, such as a touchpad, a rocker switch, a thumb-wheel, or some other type of input device. The composed data items may then be transmitted over the communication network 2119 via the communication subsystem 2111.

In a voice communication mode, overall operation of the device is substantially similar to the data communication mode, except that received signals are output to a speaker 2134, and signals for transmission are generated by a microphone 2136. Alternative voice or audio I/O subsystems, such as a voice message recording subsystem, may also be implemented on the device 2100. In addition, the display 2122 may also be utilized in voice communication mode, for example to display the identity of a calling party, the duration of a voice call, or other voice call related information.

The short-range communications subsystem 2140 enables communication between the mobile communication device 2100 and other proximate systems or devices, which need not necessarily be similar devices. For example, the short-range communications subsystem 2140 may include an infrared device and associated circuits and components, or a Bluetooth™ communication module to provide for communication with similarly-enabled systems and devices.

This written description uses examples to disclose the invention, including the best mode, and also to enable a person skilled in the art to make and use the invention. The patentable scope of the invention may include other examples that occur to those skilled in the art.

The invention claimed is:

1. A mobile device, comprising:
   a memory subsystem;
   a processing subsystem coupled to the memory subsystem and operable to store and retrieve data in the memory subsystem and to execute instructions stored in the memory subsystem;
   a memory management module stored in the memory subsystem and executed by the processing subsystem and comprising instructions operable to cause the mobile device to allocate a maximum amount of available data storage memory in the memory subsystem for storing data for each of a plurality of software applications loaded on the mobile device;
   the memory management module being further operable to automatically detect that additional data storage memory is needed for an executing software application, select one of the plurality of software applications for memory clean-up, and delete data from the data storage memory allocated to the selected software application in accordance with a pre-established memory retention policy for the selected software application; and
   a memory allocation and retention table stored in the memory subsystem and maintained by the memory management module, the memory allocation and retention table identifying the maximum amount of available storage memory for each of the plurality of software applications, wherein the memory allocation and retention table identifies the memory retention policy for the selected software application.

2. The mobile device of claim 1, wherein the memory allocation and retention table identifies a memory retention policy for each of the plurality of software applications.

3. The mobile device of claim 1, wherein the memory management module is further operable to allocate a minimum amount of available data storage memory in the memory subsystem for storing data for each of the plurality of software applications.

4. The mobile device of claim 1, wherein the memory management module automatically detects that additional data storage memory is needed for an executing software application by determining that an amount of stored data in the data storage memory for the executing software application has reached a pre-established memory threshold value for the executing software application.

5. The mobile device of claim 1, wherein the memory management module selected one of the software applications for clean-up according to a pre-established priority level of the selected software application.

6. A mobile device, comprising:
   a memory subsystem;
   a processing subsystem coupled to the memory subsystem and operable to store and retrieve data in the memory subsystem and to execute instructions stored in the memory subsystem; and
   a memory management module stored in the memory subsystem and executed by the processing subsystem and comprising instructions operable to cause the mobile device to allocate a maximum amount of available data storage memory in the memory subsystem for storing data for each of a plurality of software applications loaded on the mobile device;

the memory management module being further operable to automatically detect that additional data storage memory is needed for an executing software application, select one of the plurality of software applications for memory clean-up, and delete data from the data storage memory allocated to the selected software application in accordance with a pre-established memory retention policy for the selected software application;

wherein the memory management module is further operable to allocate a minimum amount of available data storage memory in the memory subsystem for storing data for each of the plurality of software applications;

wherein the memory management module prevents the maximum amount of available memory for each of the plurality of software applications from being decreased below the allocated minimum amount of available data storage memory.

7. The mobile device of claim 6, wherein the memory management module automatically detects that additional data storage memory is needed for an executing software application by determining that an amount of stored data in the data storage memory for the executing software application has reached a pre-established memory threshold value for the executing software application.

8. The mobile device of claim 6, wherein the memory management module selected one of the software applications for memory clean-up according to a pre-established priority level of the selected software application.

9. The mobile device of claim 6, wherein the memory management module is further operable to decrease the maximum amount of available data storage memory for the selected software application and proportionally increase the maximum amount of available memory for the executing application.

10. The mobile device of claim 6, further comprising:
a memory allocation and retention table stored in the memory subsystem and maintained by the memory management module, the memory allocation and retention table identifying the maximum amount of available storage memory for each of the plurality of software applications.

11. The mobile device of claim 10, wherein the memory allocation and retention table identifies the memory retention policy for the selected software application.

12. The mobile device of claim 11, wherein the memory allocation and retention table identifies a memory retention policy for each of the plurality of software applications.

13. A method of managing memory in a mobile device, comprising:
allocating a maximum amount of available data storage memory in a memory subsystem for storing data for each of a plurality of software applications loaded on the mobile device;
detecting automatically that additional data storage memory is needed for an executing software application;
selecting one of the plurality of software applications for memory clean-up;
deleting data from the data storage memory allocated to the selected software application in accordance with a pre-established memory retention policy for the selected software application;
identifying the maximum amount of available storage memory for each of the plurality of software applications by a memory allocation and retention table; and
identifying the memory retention policy for the selected software application for the selected software application.

14. A method of managing memory in a mobile device, comprising:
allocating a maximum amount of available data storage memory in a memory subsystem for storing data for each of a plurality of software applications loaded on the mobile device;
detecting automatically that additional data storage memory is needed for an executing software application;
selecting one of the plurality of software applications for memory clean-up;
deleting data from the data storage memory allocated to the selected software application in accordance with a pre-established memory retention policy for the selected software application;
allocating a minimum amount of available data storage memory in the memory subsystem for storing data for each of the plurality of software applications; and
preventing the maximum amount of available memory for each of the plurality of software applications from being decreased below the allocated minimum amount of available data storage memory.

15. A mobile device comprising:
means for storing data and instructions;
means operable to store and retrieve data and to execute instructions stored in the means for storing data and instructions;
means to cause the mobile device to allocate a maximum amount of available data storage memory for storing data for each of a plurality of software applications loaded on the mobile device;
means to detect that additional data storage memory is needed for an executing software application;
means for selecting one of the plurality of software applications for memory clean-up;
means for deleting data from the data storage memory allocated to the selected software application in accordance with a pre-established memory retention policy for the selected software application; and
means for identifying the maximum amount of available storage memory for each of the plurality of software applications, wherein the memory allocation and retention table identifies the memory retention policy for the selected software application.

16. A mobile device, comprising:
means for storing data and instructions;
means operable to store and retrieve data and to execute instructions stored in the means for storing data and instructions;
means to cause the mobile device to allocate a maximum amount of available data storage memory for storing data for each of a plurality of software applications loaded on the mobile device;
means to detect that additional data storage memory is needed for an executing software application;
means for selecting one of the plurality of software applications for memory clean-up;
means for deleting data from the data storage memory allocated to the selected software application in accordance with a pre-established memory retention policy for the selected software application;

means to allocate a minimum amount of available data storage memory in the memory subsystem for storing data for each of the plurality of software applications; and means for preventing the maximum amount of available memory for each of the plurality of software applications from being decreased below the allocated minimum amount of available data storage memory.

17. A method of managing memory in a mobile device, comprising:

allocating a maximum amount of available data storage memory for each of a plurality of software applications loaded on the mobile device;

automatically detecting that additional memory is needed for an executing software application;

decreasing the maximum amount of available memory for a second software application and proportionally increasing the maximum amount of available memory for the executing software application;

allocating a minimum amount of data storage memory for each of the plurality of software applications loaded on the mobile device; and preventing the maximum amount of available memory for the second software application from being decreased below the allocated minimum amount of data storage memory for the second software application.

18. The method of claim 17, wherein the second software application is selected according to a priority level.

19. The method of claim 17, further comprising:

determining if sufficient memory is available for the executing application;

if sufficient memory is not available for the executing application, then selecting a third software application for memory cleanup.

20. A method of managing memory in a mobile device, comprising:

allocating a maximum amount of available data storage memory for each of a plurality of software applications loaded on the mobile device;

automatically detecting that additional memory is needed for an executing software application;

decreasing the maximum amount of available memory for a second software application and proportionally increasing the maximum amount of available memory for the executing software application;

establishing a memory threshold value for the executing software application; and automatically detecting that additional memory is needed for the executing application by detecting that an amount of stored data in the data storage memory for the executing application has reached the memory threshold value.

21. The method of claim 20, wherein the second software application is selected according to a priority level.

22. The method of claim 20, further comprising:

determining if sufficient memory is available for the executing application;

if sufficient memory is not available for the executing application, then selecting a third software application for memory cleanup.

23. A method of managing memory in a mobile device, comprising:

allocating a maximum amount of available data storage memory for each of a plurality of software applications loaded on the mobile device;

automatically detecting that additional memory is needed for an executing software application;

decreasing the maximum amount of available memory for a second software application and proportionally increasing the maximum amount of available memory for the executing software application;

determining a memory retention target for the second software application; and deleting data from the data storage memory allocated to the second software application until an amount of data remaining in the data storage memory location is at or below the memory retention target.

24. The method of claim 23, wherein the second software application is selected according to a priority level.

25. The method of claim 23, further comprising:

determining if sufficient memory is available for the executing application;

if sufficient memory is not available for the executing application, then selecting a third software application for memory cleanup.

* * * * *